June 17, 1930.  C. F. CAROTHERS  1,764,827
CATTLE POKE
Filed Aug. 23, 1929
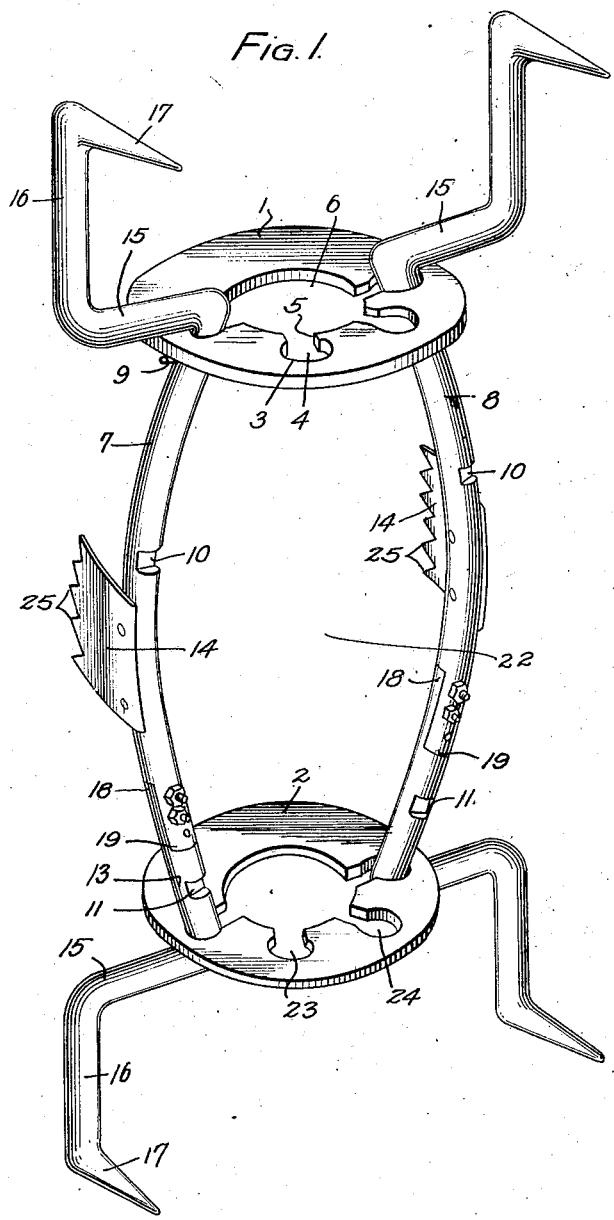
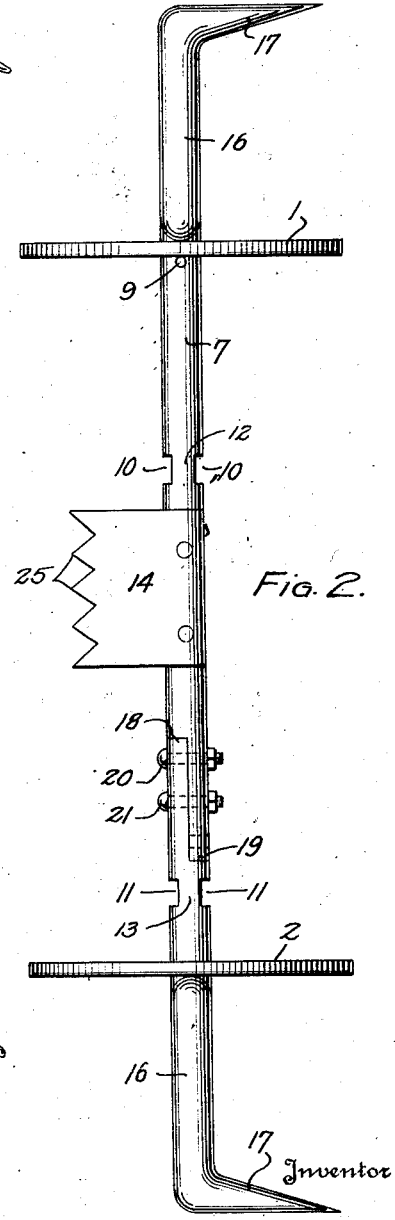
Inventor
Charles F. Carothers
By Frank H. Schwartz
Attorney Patented June 17, 1930

1,764,827

UNITED STATES PATENT OFFICE

CHARLES F. CAROTHERS, OF SALOME, ARIZONA

CATTLE POKE

Application filed August 23, 1929. Serial No. 387,897.

This invention relates to cattle pokes which are applied to the necks of animals to prevent them from passing through or tearing down fences, and comprises all improvements over the prior art which are disclosed in this application.

One object is to provide a simple rugged animal poke which can be easily adjusted to the necks of different sized animals, and readily applied to or removed from the animals.

Another object is to provide a simple rugged pivoted construction of side bars carrying spurs adapted to engage the animal's neck somewhat proportionately to the violence of the attack made by the animal on the fence, and yet not likely to seriously injure the animal.

The above and other objects which will hereinafter appear, are attained by the new and useful improvements disclosed in this application. To enable others skilled in the art to fully understand the essential characteristics of the improvements, drawings illustrating one mode of carrying out the invention have been annexed as part of this disclosure.

Fig. 1 is a perspective view of the poke.

Fig. 2 is a side view of the same.

One form of device for carrying out the invention comprises upper and lower washer-like ring members 1, 2 each having a plurality of slots 3 having an enlarged opening 4 with a narrow entrance 5 leading to the center opening 6 of the ring member.

Pivotally engaged in any two slots of each ring member are side bars 7, 8 preferably made of round metal of a size easily fitting in enlarged openings 4 but too large to pass through narrow entrance 5. To prevent ring member 1 sliding downward on bars 7, 8, the latter are each provided with a pin 9. Bars 7, 8 at 10, 11 are cut away to provide narrow portions 12, 13 adapted to pass through narrow entrance 5.

Riveted to bars 7, 8 are spurs 14. Bars 7, 8 each have horizontal lever arms 15 carrying extensions 16 provided with spears 17.

To enable the poke to be applied to and removed from, cattle, each bar 7, 8 is made in two sections having overlapping joint portions 18, 19 connected by bolts 20, 21 secured in two of the three holes in the joint portions 18, 19. It will be obvious how this two-bolt three-hole connection permits adjusting the length of bars 7, 8.

To adjust the animal neck opening 22 narrower than shown, ring member 2 is slid up on one of the bars 7 or 8 until narrow portion 13 is reached which permits sliding the bar out through narrow entrance 5 and permits inserting the narrow portion through the narrow entrance of either opening 23, 24 as preferred, after which, ring member 2 is allowed to slide down to normal position resting on lever arms 15.

To adjust the upper ring member 1 to correspond with the adjustment of lower ring member 2 just made, both bars 7, 8 are turned through a half circle to bring pins 9 under narrow entrances 5 of the slots, when ring 1 can be slid down to narrow portion 12 and the proper bar 7 or 8 passed out through narrow entrance 5 of the slot it is in and then into the proper one of the two extra openings in ring member 1. Ring member 1 is then slid up on bars 7, 8 above pins 9, and lever arms 15 are rotated through a half circle back to their original position.

When mounted on an animal with its head projecting out through opening 22 in the direction of spurs 17, any attempt of the animal to force its head through a fence causes extensions 16 of lever arms 15 to rock the bars where they are pivoted in the openings, to result in pressing spurs 14 against the neck of the animal with a pressure somewhat proportionate to the violence of the efforts of the animal to push its head through the fence, and yet owing to the shortness of the individual teeth 25 of spurs 14, the animal is not likely to be injured. Spurs 17 prevent the fence wires from slipping off the ends of the extensions 16.

The invention may be embodied in other specific forms without departing from the spirit or essential characteristics of the intion, and the present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A cattle poke comprising, two spaced washer-like ring members and two spaced side bars pivoted to said washers, each ring member having a central aperture adapted to receive said side bars, and the pivoted connection comprising slots in the ring members opening into said central apertures.

2. A cattle poke comprising upper and lower spaced washer-like ring members and two spaced side bars pivoted to said ring members, the pivoted connection comprising slots in the ring members having a narrow entrance and an enlarged opening connecting with the narrow entrance.

3. The cattle poke of claim 2 in which each ring member has more than two slots to permit of shifting of a side bar into one or another slot for adjustment of the size of neck opening for animals.

4. The cattle poke of claim 2 in which the portions of the bars which normally occupy the slots are larger than the slot entrance.

5. The cattle poke of claim 2 in which the upper ring member normally lies between projections on one of the bars.

6. A cattle poke comprising, upper and lower spaced washer-like ring members, side bars pivoted to said ring members and having oppositely extending lever portions, spurs secured to the bars intermendiate the washers and extending in a direction transverse to a plane passing longitudinally through both bars, and spears on the lever portions extending in a direction opposite to the spurs.

In testimony whereof I hereunto affix my signature.

CHARLES F. CAROTHERS.